US012707436B2

(12) United States Patent
Sahai et al.

(10) Patent No.: US 12,707,436 B2
(45) Date of Patent: Aug. 11, 2026

(54) SYSTEMS AND METHODS OF MODIFYING A PHASE OF DATA CAPTURE VIA A SENSOR

(71) Applicant: Meta Platforms Technologies, LLC, Menlo Park, CA (US)

(72) Inventors: Achaleshwar Sahai, San Jose, CA (US); Madhusudan Kinthada Venkata, South San Diego, CA (US); Manjinder Sandhu, San Diego, CA (US); Ping Wang, Redmond, WA (US); Shivank Nayak, Milpitas, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 606 days.

(21) Appl. No.: 18/084,756

(22) Filed: Dec. 20, 2022

(65) Prior Publication Data

US 2024/0205882 A1 Jun. 20, 2024

(51) Int. Cl.
*H04L 47/56* (2022.01)
*H04W 72/02* (2009.01)
*H04W 72/12* (2023.01)
*H04W 76/28* (2018.01)

(52) U.S. Cl.
CPC .......... *H04W 72/02* (2013.01); *H04W 76/28* (2018.02)

(58) Field of Classification Search
CPC . H04W 72/02; H04W 76/28; H04W 28/0205; H04L 47/562; H04L 47/56
USPC ........................ 370/412, 417, 418, 428, 429
See application file for complete search history.

(56) References Cited

U.S. PATENT DOCUMENTS

2015/0009815 A1* 1/2015 Hsu ....................... H04W 76/28 370/230.1
2020/0037345 A1* 1/2020 Ryoo .................... H04W 76/27
2020/0322649 A1* 10/2020 Melkote Krishnaprasad ............. H04N 21/439
2022/0014403 A1* 1/2022 Yoshioka .............. H04L 27/106
2022/0066019 A1* 3/2022 Waheed .................. G01S 13/84
2022/0201606 A1* 6/2022 Shafin ..................... H04L 49/90
2023/0328649 A1* 10/2023 Xu ........................ H04W 76/28 370/311
2023/0354394 A1* 11/2023 Zhang ................... H04W 72/23
2024/0090076 A1* 3/2024 Hande ............... H04W 28/0289
2024/0121073 A1* 4/2024 Ye ......................... H03L 7/0807

* cited by examiner

*Primary Examiner* — Ayman A Abaza
*Assistant Examiner* — Tracy L Williams
(74) *Attorney, Agent, or Firm* — Foley & Lardner LLP

(57) ABSTRACT

Systems and methods for projecting transmission occasions include a device that may determine a duration in which data is in a queue prior to transmission to an endpoint. The device may modify a phase of data capture via a sensor according to the duration. The device may capture via the sensor subsequent data according to the phase. The device may transmit the subsequent data from the queue to the endpoint.

18 Claims, 6 Drawing Sheets

SYSTEMS AND METHODS OF MODIFYING A PHASE OF DATA CAPTURE VIA A SENSOR

FIELD OF DISCLOSURE

The present disclosure is generally related to latency optimization and power tradeoff for real-time traffic, including but not limited to systems and methods of projecting transmission occasions.

BACKGROUND

Artificial reality such as AR, VR, or mixed reality (MR) provides immersive experience to a user. Devices may use different types of technology for AR, VR, and MR applications. Such applications may include capturing, processing, and transmitting data.

SUMMARY

Various embodiments disclosed herein are related to systems, methods, and computer-readable media for optimizing a phase in which data is captured. A device may determine a duration in which data is in a queue prior to transmission to an endpoint. The device may modify a phase of data capture via a sensor, according to the duration. The device may capture, via the sensor, subsequent data according to the phase. The device may transmit, from the queue, the subsequent data to the endpoint.

In some embodiments, the device may determine a first timestamp associated with the data being added to the queue, and a second timestamp associated with data being transmitted from the queue to the endpoint. The device may determine the duration according to a difference between the first timestamp and the second timestamp. In some embodiments, the device may determine configuration information including a wake time and a frequency of a modem for the device. The device may determine, from an application executing on the device, a sampling frequency. The device may determine the duration according to the configuration information, the sampling frequency, and an average data processing duration. In some embodiments, the device may determine the average data processing duration according to one or more first timestamps for previous data captured via the sensor and one or more second timestamps for the previous data being added to the queue for transmission.

In some embodiments, the device may modify the phase of the data capture according to the duration reduced by an offset. In some embodiments, the data is first data, and where the first data and the subsequent data are captured at a common sampling frequency set by an application executing on the device. In some embodiments, the device transmits the subsequent data from the queue to the endpoint according to a connected mode-discontinuous reception (C-DRX) schedule. In some embodiments, the sensor may include at least one of an imager or a microphone. In some embodiments, the duration is a first duration. The device may add the subsequent data to the queue for transmission to the endpoint. The device may transmit the subsequent data from the queue to the endpoint, after a second duration in which the subsequent data is in the queue, the second duration being less than the first duration.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

For devices in cellular networks, a transmitting device which is transmitting video or audio data may typically capture and process the data at a certain frequency. Once the data is processed, the device may move the data to a queue for a modem of the transmitting device to transmit the data to a receiving device (e.g., once the modem wakes up). Latency may be caused by the wait time in which the data remains in the queue.

Latency is relevant for artificial reality such as AR, VR, or mixed reality (MR). Artificial reality provides an immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). The process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

This application is directed to optimizing a phase in which data is captured at the device (e.g. audio or video data), such that, upon completion of processing, the data remains in the queue for a short duration prior to the modem waking up. This may provide latency optimization by minimizing a difference between a point in time in which data is captured by the transmitting device and a point in time in which data is received by the receiving device, while also not increasing power consumption of the device by permitting the modem to maintain a sleep/low-power schedule without any early wake up.

Figure 1:
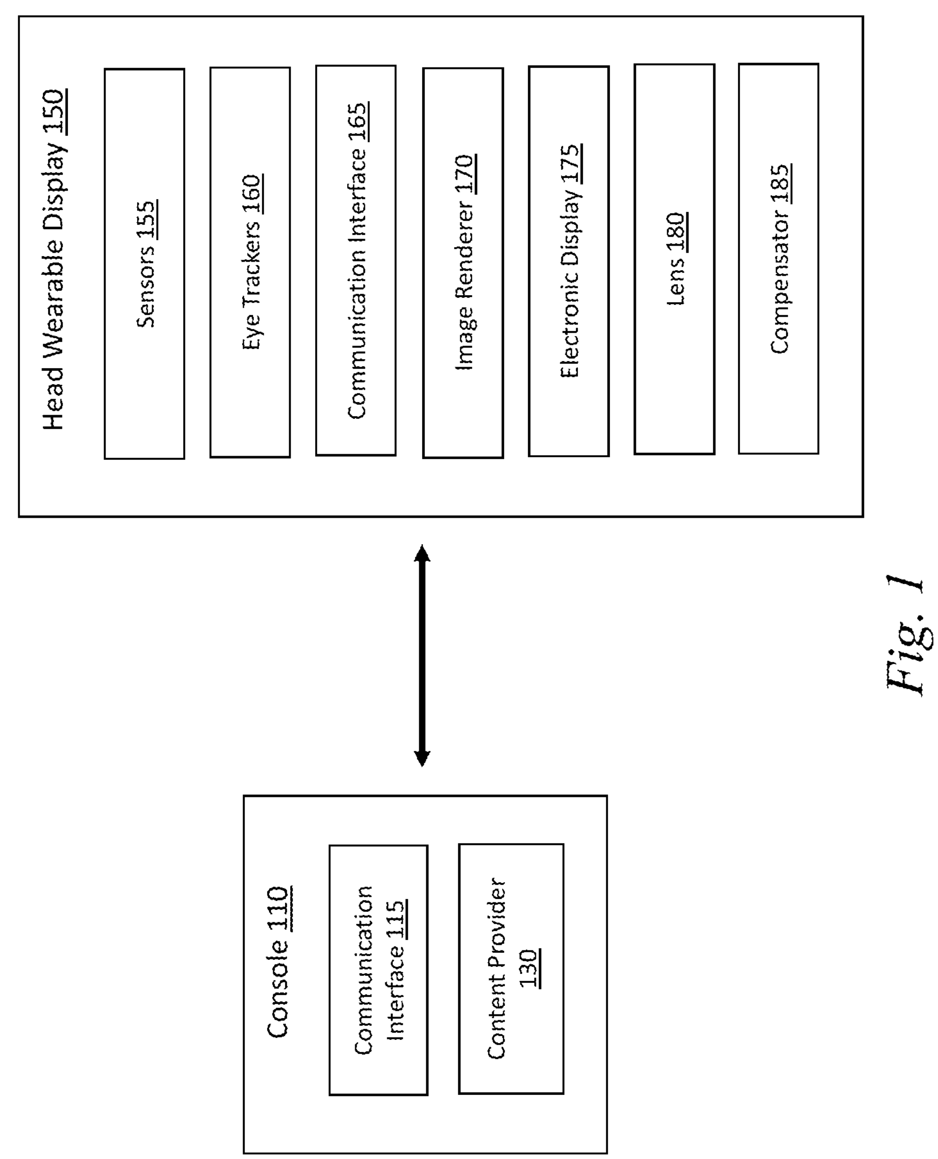
FIG. 1 is a diagram of a system environment including an artificial reality system, according to an example implementation of the present disclosure.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HWD 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
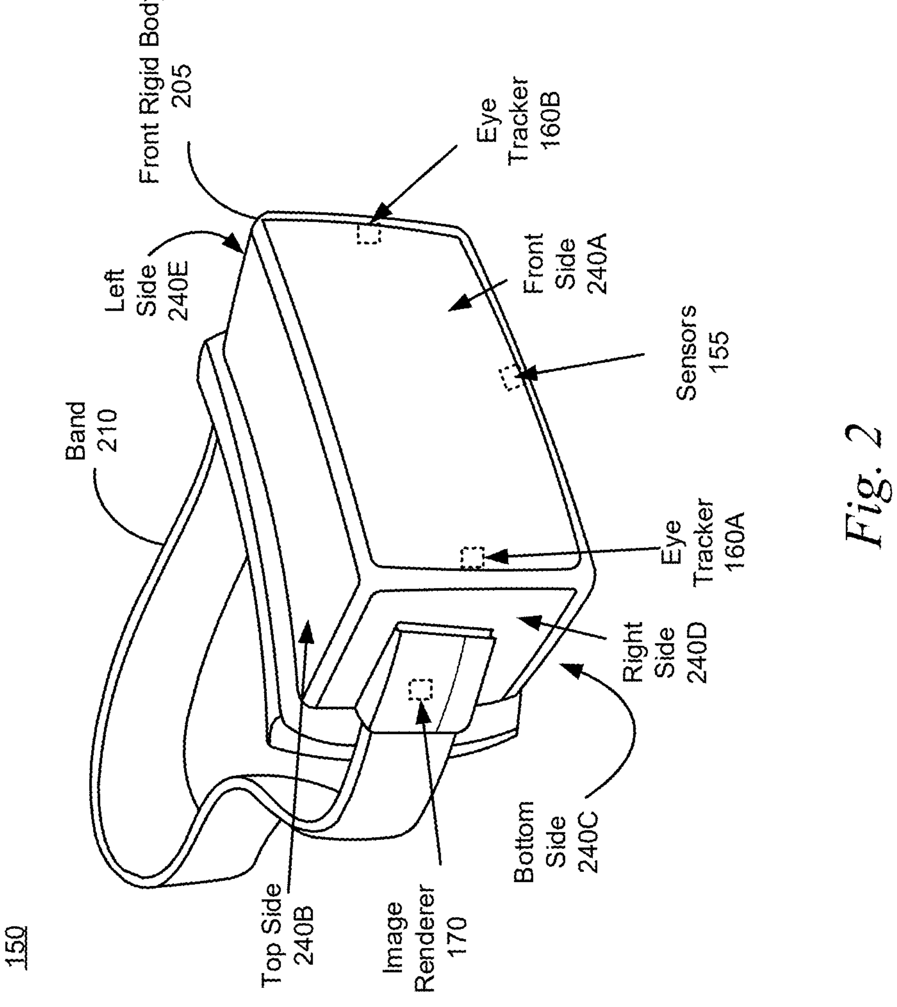
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
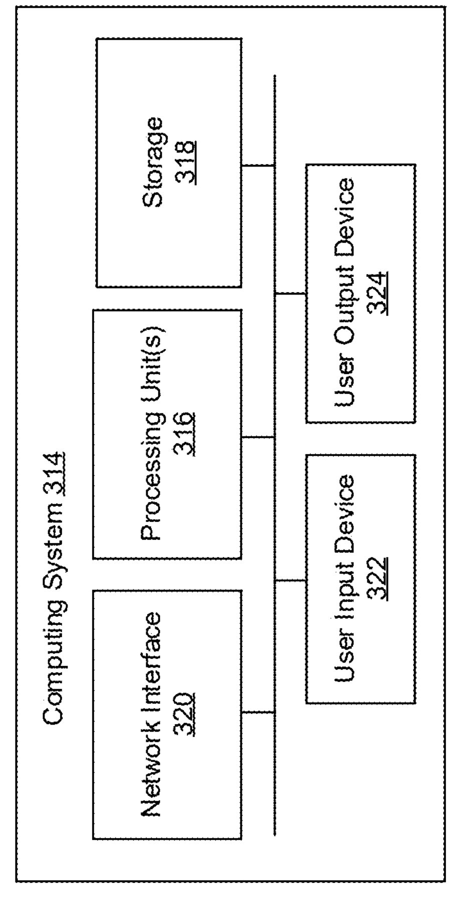
FIG. 3 is a block diagram of a computing environment, according to an example implementation of the present disclosure.

FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Various operations described herein can be implemented on computer systems having the configuration that is same as or similar to that of the computing system 314.

For devices in cellular networks, a transmitting device which is transmitting video or audio data (or other types of data) may capture and process the data at a certain frequency or cadence. Once the data is processed, the device may move the data to a queue for a modem of the transmitting device to transmit the data to a receiving device (e.g., once the modem wakes up to process and/or transmit the data). The wait time in which the data remains in the queue may contribute to latency.

Latency is relevant for artificial reality such as AR, VR, mixed reality (MR), or extended reality (XR). Artificial reality provides an immersive experience to a user. In one example, a user wearing a head wearable display (HWD) can turn the user's head, and an image of a virtual object corresponding to a location of the HWD and a gaze direction of the user can be displayed on the HWD, to allow the user to feel as if the user is moving within a space of artificial reality (e.g., a VR space, AR space, MR space, or XR space). The process of detecting the location of the HWD and the gaze direction of the user wearing the HWD, and rendering the image to the user may be performed within a frame time (e.g., less than 11 ms). Any latency between a movement of the user wearing the HWD and an image displayed corresponding to the user movement can cause judder, which may result in motion sickness and can degrade the user experience.

This application is directed to optimizing a phase in which data is captured at the device (e.g. audio or video data), such that, upon completion of processing, the data remains in the queue for a short duration prior to the modem waking up. The systems and methods described herein may thus provide latency optimization by minimizing a difference between a point in time in which data is captured by the transmitting device and a point in time in which data is received by the receiving device, while also not increasing power consumption of the device by permitting the modem to sleep according to a determined schedule without any early wake up.

Figure 4:
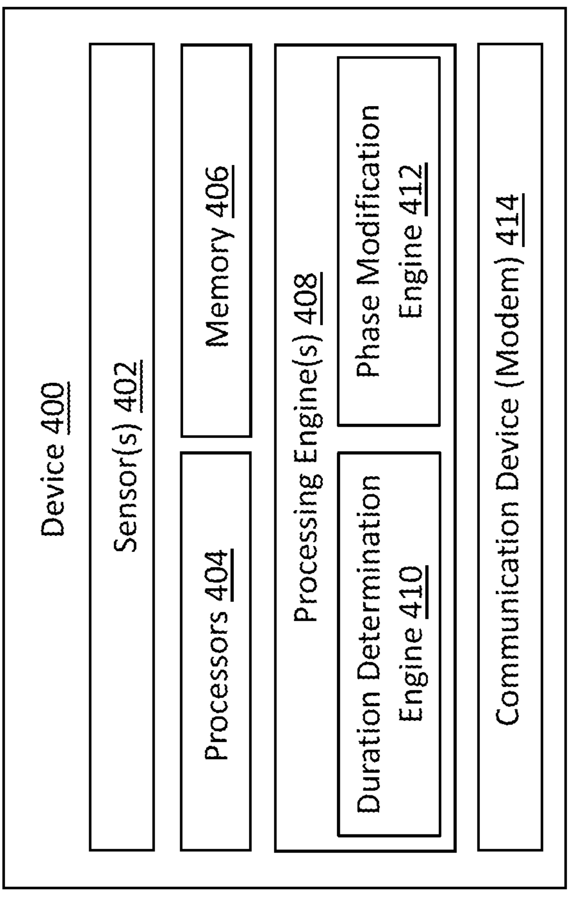
FIG. 4 is a block diagram of a device for projecting transmission occasions, according to an example implementation of the present disclosure.

FIG. 4 shows a block diagram of a device 400 for projecting (e.g., forecasting/estimating) transmission occasions (e.g., according to a wake schedule of a modem), according to an example implementation of the present disclosure configured to implement the present disclosure. The device 400 may be configured to capture, process, and transmit data. The device 400 may be or include user equipment, such as a smartphone, other mobile phone, tablet computer, wearable computing device (e.g., smart watch, smart glasses, head wearable display), desktop computer, laptop computer, or implemented with distributed computing devices. The device 400 may also be an augmented reality device or a virtual reality device. In some embodiments, the device 400 may include sensor(s) 402, processor(s) 404, memory 406, one or more processing engines 408, and a communication device 414.

The device 400 may include sensor(s) 402. The sensor(s) 402 may be or include any device, component, element, and/or hardware configured to detect, measure, quantify, determine, or otherwise sense one or more conditions. In some embodiments, the sensor(s) 402 may include one or more imaging sensors, one or more audio sensors, one or more accelerometers, one or more gyroscopes, one or more magnetometers, or another suitable type of sensor that detects, determines, or otherwise senses audio, video, motion and/or location. In some embodiments, the sensor(s) 402 may be configured to capture data, such as an image or video. In some embodiments, the sensor(s) 402 may be configured to capture image data and/or depth measurements for rendering an image for artificial reality. After the sensor(s) 402 capture the data, the processor(s) 404, memory 406, one or more processing engines 408, and communication device 414 may process and transmit the data.

The device 400 may include one or more processor(s) 404 and memory 406. The processor(s) 404 may be or include any device, component, element, and/or hardware configured to prepare, generate, produce, convert, refine, transform, or otherwise process data captured (e.g., by the one or more sensor(s) 402). The memory 406 may be or include any device, component, element, and/or hardware configured to save, keep, maintain, organize, or otherwise store data. The processor(s) 404 and memory 406 may be configured to process and store the data captured by the sensor(s) 402. Similar to processors 316 referenced above in FIG. 3, through suitable programming, the processor(s) 404 may provide various functionality for the device 400, including any of the functionality described herein as being performed by a server or client. The memory 406 may include or incorporate a queue for the device 400. The queue may be or include a set of data or content organized in order of transmission to an endpoint. For example, as the processor(s) 404 process data from the sensor(s) 402, the processor(s) 404 may add the data to the queue of the memory 406 for subsequent transmission to the endpoint.

The device 400 may include one or more processing engines 408. The one or more processing engines 408 may be or include any device, component, element, or hardware designed or implemented to perform one or more functions of the device. In some embodiments, the one or more processing engines 408 may be or include a duration determination engine 410 and a phase modification engine 412. As described in greater detail below, the duration determination engine 410 may be configured to determine a duration associated with holding/maintaining/buffering/keeping data in a queue for transmission to an endpoint. Using the duration determined by the duration determination engine 410, the phase modification engine 412 may be configured to modify a phase of data captured according to that duration.

The device 400 may include a communication device 414. The communication device 414 may be or include any device, component, element, and/or hardware configured to send, disseminate, transfer, deliver, or otherwise transmit data captured. The communication device 414 may be configured to transmit data captured via the sensor(s) 402 from the device 400 to another device after the processor(s) 404, memory 406, and one or more processing engines 408 process the data captured. To transmit the data, the communication device 414 may be configured to wake up at a specific frequency which is determined by or set according to configuration information of the communication device 414. The configuration information of the communication device 414 may be or include information based on set characteristics specific to the device 400. For example, the configuration information may be or include a connected mode-discontinuous reception (C-DRX) schedule defining a time (e.g., start time, duration, periodic cycle) in which the communication device 414 wakes up, a frequency at which the communication device 414 transmits data, etc. When the communication device 414 is awake, the data captured by the sensor(s) 402, processed by the processor(s) 404 and added to the queue may be transmitted to another device. For instance, the communication device 414 may be configured to pull data from the queue of the memory 406, and can transmit the data over a cellular connection to another device or endpoint. In some embodiments, the communication device 414 may be a modem (e.g., a cellular modem configured to access a cellular network).

Figure 5B:
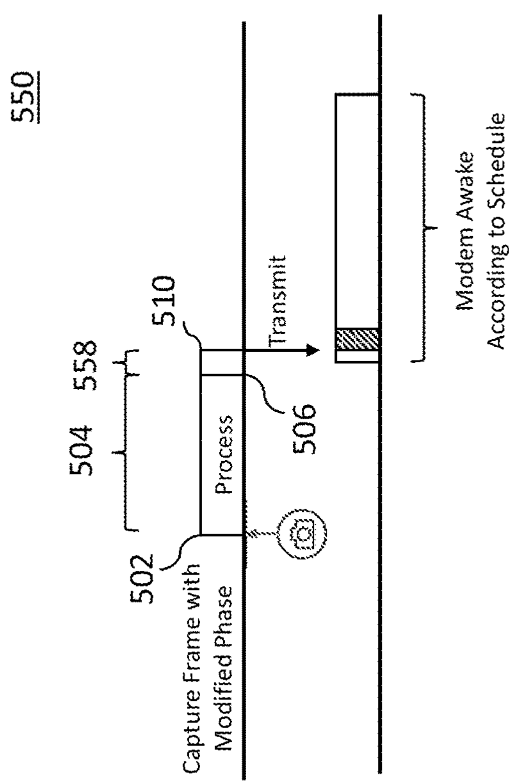
FIG. 5B is a diagram of an example timing diagram showing a process of capturing and transmitting data, according to an example implementation of the present disclosure.
Figure 5A:
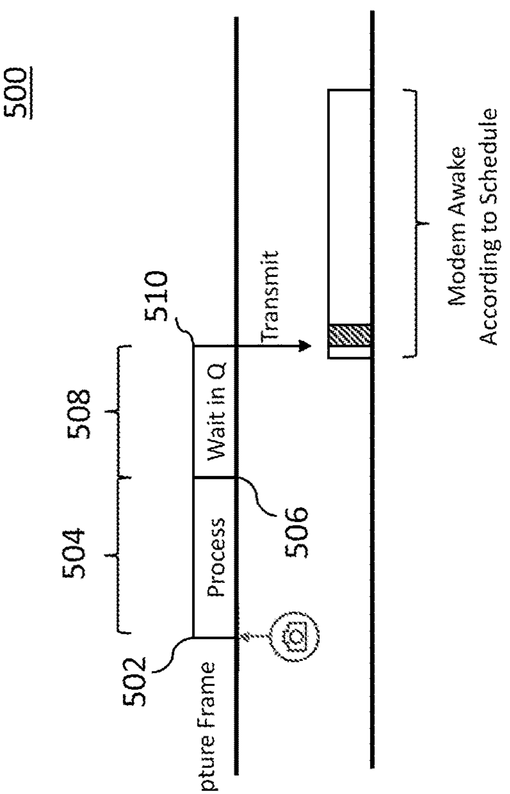
FIG. 5A is a diagram of an example timing diagram showing a process of capturing and transmitting data, according to an example implementation of the present disclosure.

FIG. 5A is a diagram of an example time series 500 showing a process of capturing and transmitting data, according to an example implementation of the present disclosure. The device 400 may be configured to capture, process, and transmit data according to the time series 500.

As illustrated in FIG. 5A and with reference to FIG. 4, at a first time instance 502, the sensor(s) 402 may capture data. For example, the sensor(s) 402 may be configured to capture data at a frequency or periodicity as defined by an application of the device 400 (e.g., a data refresh rate, a sampling frequency, etc.). As such, the application of the device 400 may be configured to control the sensor(s) 402 to capture data (e.g., audio/video/image/etc. data) at the first time instance 502. Upon capturing the data, the processor(s) 404 may be configured to process the data captured by the sensor(s) 402. The processor(s) 404 may be configured to process the data for a processing time/window/duration 504. As such, the processing duration 504 may be or include a period of time for processing data collected or otherwise sensed by the sensor(s) 402. In some embodiments, the processing duration 504 may be defined or include durations for performing various processes, such as a decompression process, a scan-out process, a display process, or any other process as may be performed by the device 400 prior to transmission. As such, the processes may relate to, correspond to, or otherwise be associated with the display, generation, or rendering of a frame, interface, or other image.

Upon completion of the processes such that the data captured by the sensor(s) 402 has been processed and is ready for transmission, at a second time instance 506, the processor(s) 404 may be configured to add, incorporate, or otherwise queue the processed data in the queue of the memory 406. The processor(s) 404 may be configured to add the data in the queue for transmission via the communication device 414. In various implementations, the data may be included in the queue for a first duration 508 until, at a third time instance 510, the communication device 414 wakes up and is ready to transmit the data to the endpoint. As described above, the communication device 414 may be configured to wake up according to the configuration information (e.g., C-DRX schedule, for instance). As the first duration 508 in which the data is queued increases, latency may correspondingly increase, thereby decreasing user experience.

The duration determination engine 410 may be configured to detect, estimate, quantify, identify, or otherwise determine the first duration 508. The duration determination engine 410 may be configured to determine the first duration 508, for the phase modification engine 412 to modify the phase of data capture so as to reduce the first duration 508 (as shown in FIG. 5B). Such implementations and embodiments may improve user experience by decreasing latency (e.g., by having the data queued for a shorter duration).

In some embodiments, the duration determination engine 410 may be configured to determine the first duration 508 by determining a first timestamp associated with the second time instance 506 when the processor(s) 404 add data to the queue of the memory 406, and by determining a second timestamp associated with the third time instance 510 when the communication device 414 wakes up and is ready to pull the data from the queue to process the data and/or transmit the data from the queue to the endpoint. The duration determination engine 410 may then determine the first duration 508 by calculating the difference between the first timestamp and the second timestamp. For example, when the processor(s) 404 add the data to the queue, the processor(s) 404 may append, include, or otherwise incorporate a timestamp in association with the data in the queue. Additionally, when the communication device 414 wakes up and pulls the data from the queue for transmission, the communication device 414 may add another timestamp in association with the data. Similarly, and as another example, when the processor(s) push the data from the queue to the modem for transmitting the data to the endpoint, the processor(s) may be configured to provide the second timestamp (e.g., either to the duration determination engine 410 or append the second timestamp to the data for identification by the duration determination engine 410). The duration determination engine 410 may be configured to determine the duration based on a difference between the first timestamp and the second timestamp.

In some embodiments, the duration determination engine 410 may be configured to determine the first duration 508 by determining configuration information of the communication device 414. For example, the configuration information may be or include a connected mode-discontinuous reception (C-DRX) schedule defining a time in which the communication device 414 wakes up, a frequency at which the communication device 414 transmits data, etc. The duration determination engine 410 may also be configured to determine a sampling frequency which may be the frequency at which the sensor(s) 402 capture data. The duration determination engine 410 may be configured to determine the sampling frequency from the application (e.g., at the application layer). In other words, the sampling frequency may be or include a frequency or cadence in which the data is captured by the sensor(s) 402.

Additionally, the duration determination engine 410 may be configured to determine an average data processing duration based on previous data capture instances. For example, and similar to the determination of the duration described above, when the sensor(s) 402 capture the data, the sensor(s) 402 and/or the processors(s) 404 may append, include, or otherwise incorporate a timestamp in association with the start of data being processed. Additionally, when the processor(s) 404 add the data to the queue (e.g., following execution of the various processes), the processor(s) 404 may append, include, or otherwise incorporate a timestamp in association with the data being added the queue. The duration determination engine 410 may be configured to determine the average data processing duration based on the difference between the timestamp associated with the start of data being processed (or being captured) and the timestamp associated with data in the queue, and the sampling frequency. Specifically, the duration determination engine 410 may be configured to determine the difference between the timestamp associated with the start of data being processed and the timestamp in association with data in the queue for X number of cycles, determine the total data processing duration by adding each difference together, and then determine the average data processing duration by dividing the total data processing duration by the X number of cycles.

The duration determination engine 410 may be configured to determine the first duration 508 according to the configuration information, the sampling frequency, and the average data processing duration. For example, the duration determination engine 410 may be configured to utilize the wake time of the communication device and the frequency at which the communication device 414 transmits data (e.g., from the configuration information relating to the communication device 414), to determine when the communication device 414 may pull data from the queue of the memory 406. Additionally, the duration determination engine 410 may be configured to utilize the timestamp in association with the sensor(s) 402 capturing the data and the average processing duration to determine, identify, or estimate when the processor(s) 404 may add data to the queue of the memory 406. The duration determination engine 410 may be configured to determine the first duration 508 based on a difference between the timestamp in which the processor(s) 404 may add data to the queue of the memory 406 and the timestamp in which the communication device 414 may pull data from the queue of the memory 406 to transmit to the endpoint.

Referring now to FIG. 5B together with FIG. 4, the phase modification engine 412 may be configured to modify a phase of data capture, to reduce the duration in which subsequent data is queued. Specifically, FIG. 5B is a diagram of an example timing diagram 550 showing a process of capturing and transmitting data. As illustrated in FIG. 5B, the device 400 may be configured to adjust, move, shift, or otherwise modify a phase of the data capture according to the determined duration in which the data is in the queue, to reduce the duration for subsequent data. As described above, the communication device 414 may be configured to wake up according to the configuration information (e.g., C-DRX schedule, for instance). Since the wake time of the communication device 414 may be determined based on the configuration information (and may therefore be a fixed schedule), the phase modification engine 412 may be configured to modify the phase of the data capture to reduce the duration in which data is queued. The phase modification engine 412 may be configured to determine, receive, or otherwise identify the first duration 508 determined by the duration determination engine 410 for modifying the phase of data capture. The phase modification engine 412 may be configured to modify the phase of data capture according to the first duration 508, to reduce the duration of subsequent data in the queue.

In some embodiments, the phase modification engine 412 may be configured to determine a phase shift to apply to the data capture. The phase modification engine 412 may be configured to determine the phase shift according to the first duration 508. In some embodiments, the phase modification engine 412 may be configured to determine the phase shift as being equal to the first duration 508. In some embodiments, the phase modification engine 412 may be configured to determine the phase shift according to an average of first durations (e.g., maintaining the phase as is for a plurality of intervals, and computing an average based on the duration determined by the duration determination engine 410 for each interval). In some embodiments, the phase modification engine 412 may be configured to determine the phase shift by reducing the first duration 508 (or average of first durations) by a threshold value. For example, the phase modification engine 412 may be configured to determine a reduced phase shift by subtracting or otherwise reducing the first duration or first phase shift by a threshold value. The threshold value may be, for instance, a window to accommodate for variation in processing duration (e.g., duration 504) on an interval-by-interval basis.

In some embodiments, to modify the phase, the phase modification engine 412 may be configured to send instructions to one or more components of the device, to modify a start of the data capture according to the phase shift. In some embodiments, the phase modification engine 412 may be configured to send the instructions to the application executing on the processor(s) 404 to modify a start time for the data capture (e.g., according to the phase shift). For example, the phase modification engine 412 may be configured to modify the start time by shifting (e.g., delaying or expediting) the start time for the data capture by the phase shift, with respect to a previous time instance (e.g., shown in the time series in FIG. 5A). In this regard, modifying the phase of data capture may include delaying, expediting, changing, or otherwise shifting a time in which data is captured (e.g., via the sensor(s) 402) based on or according to the phase shift determined by the phase modification engine 412. The phase modification engine 412 may be configured to modify the phase by sending instructions to the sensor(s) 402. In other words, rather than delaying the phase of data capture by sending instructions to the application, the phase modification engine 412 may additionally or alternatively modify the phase of data capture by controlling the sensor(s) 402. The phase modification engine 412 may be configured to modify the phase of data capture while maintaining the sampling frequency. In this regard, the sensor(s) 402 may be configured to capture data at the same sampling frequency (e.g., as defined by the application), but at a different or shifted capture time according to the modified phase.

In various implementations, after the phase modification engine 412 modifies the phase of the data capture, the subsequent data captured may be included in the queue for a second duration 558, the second duration 558 being less than the first duration 508, until a third time instance 510 in which the communication device 414 wakes up and is ready to transmit the data to the endpoint. Reducing the duration in which data is queued may correspondingly decrease latency, thereby increasing user experience. Additionally, although the phase modification engine 412 may modify the phase of data capture, the phase modification engine 412 may send a signal to the application of the device 400 to maintain the sampling frequency.

Figure 6:
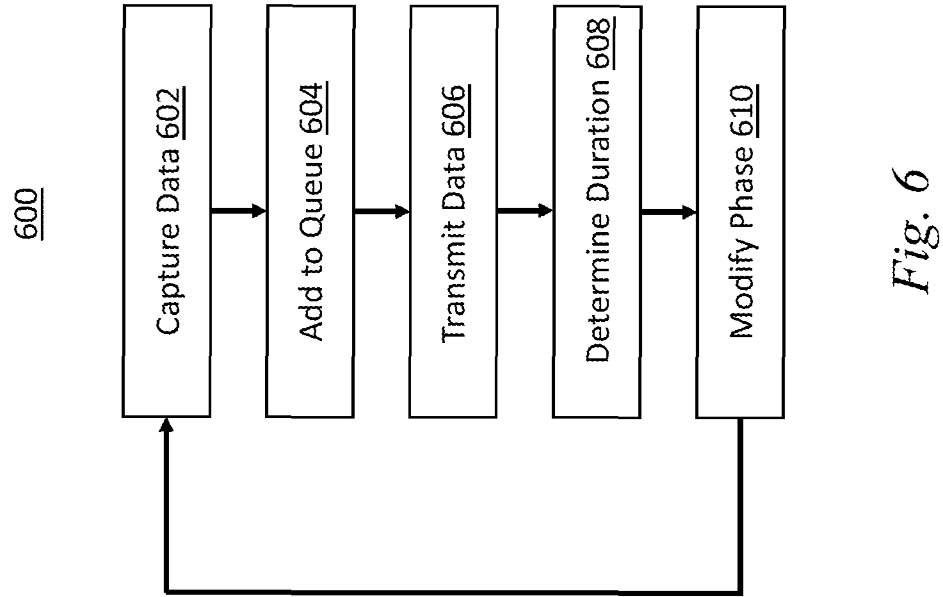
FIG. 6 is a flow chart of a method for optimizing a phase in which data is captured, according to an example implementation of the present disclosure.

Referring now to FIG. 6 depicted is a flow chart of a method 600 for optimizing a phase in which data is captured, according to an example implementation of the present disclosure. The method 600 may be performed by the components, elements, and/or hardware described above with reference to FIG. 1-FIG. 5B. As a brief overview, at step 602, the method 600 may include capturing data 602 via the sensor(s) 402. At step 604, the method 600 may include adding the captured data to the queue 604. At step 606, the method 600 may include transmitting the data 606 from the queue to the endpoint. At step 608, the method 600 may include determining a duration associated with data in the queue. At step 610, the method may include modifying a phase 610 of data capture via the sensor(s) 402 according to the duration, capturing the subsequent data 602 via the sensor(s) 402 according to the phase, adding the subsequent data to the queue 604, and/or transmitting the subsequent data 606 from the queue to the endpoint.

At step 602, the method 600 may include capturing data 602 via the sensor(s) 402. In some embodiments, the method 600 may include capturing, by the sensor(s) 402 of the device, first sensor data. The sensor(s) 402 capture the first sensor data according to a sampling frequency or cadence. For example, the processor(s) 404 of the device 400 may be configured to determine the sampling frequency or cadence from an application or resource executing on the device 400 (e.g., at the application layer of the device 400). The sensor(s) 402 may thus capture/acquire the data at various intervals or frequencies. The data captured by the sensor(s) 402 may include, for example, image data, video data, audio data, motion or movement data, position data, etc.

At step 604, the method 600 may include adding the captured data to a queue. In some embodiments, one or more processor(s) 404 of the device may add, incorporate, or otherwise queue processed data corresponding to the captured data (e.g., at step 602) to a queue of the device maintained in the memory 406. The processor(s) 404 may add the processed data to the queue after the processor(s) 404 process the data captured by the sensor(s) 402 at step 602. For example, the processor(s) 404 may process the data captured by the sensor(s) 402 so that the communication device 414 can transmit the data to an endpoint. The processor(s) 404 may process the data by performing various functions or steps on the data to, e.g., filter or refine the data, reformat/encode/modulate the data, compress the data, etc. In various implementations, the data may be included in the queue for a first duration 508 until the communication device 414 wakes up and is ready to transmit the data to the endpoint.

At step 606, the device 400 may transmit the data from the queue to an endpoint. In some embodiments, the device 400 may transmit the data from the queue to the endpoint responsive to the communication device 414 waking up according to a schedule or operational cycle of the communication device. The endpoint may be or include another device communicably coupled to the device 400 via a cellular connection. For example, the endpoint may be or include a server corresponding to an application executing on the device 400, a device of another user communicably coupled to the device 400, etc. The processor(s) 404 may incorporate data corresponding to the endpoint in association with the data for transmission to the endpoint, in the queue. In some embodiments, processor(s) 404 may push the data from the queue to the communication device 414 for transmission responsive to the communication device 414 waking up. In some embodiments, the communication deice 414 may pull the data from the queue for transmission responsive to the communication device 414 waking up.

The communication device 414 may be configured to wake up at a specific frequency which is determined by or set according to configuration information of the communication device 414. The configuration information of the communication device 414 may be or include information based on set characteristics of the device 400 and/or negotiated with a cellular network. For example, the configuration information may be or include a connected mode-discontinuous reception (C-DRX) schedule defining a time in which the communication device 414 wakes up, a frequency at which the communication device 414 (wakes up and) transmits data, etc. When the communication device 414 is awake, the data captured by the sensor(s) 402, processed by the processor(s) 404 and added to the queue may be transmitted to another device or endpoint (e.g., using the information or identifying data for the endpoint linked to the data in the queue).

At step 608, the processor(s) 404 may determine a duration associated with data in the queue for transmission to an endpoint. In some embodiments, the processor(s) 404 may determine the duration in which data is in the queue prior to the data being transmitted to the endpoint. The processor(s) 404 may determine the first duration 508 once the processor(s) 404 add data to the queue. In some embodiments, the processor(s) 404 may determine the first duration 508 responsive to the processor(s) 404 detecting latency which exceeds a threshold latency value. In some embodiments, the processor(s) 404 may determine the first duration 508 at various intervals or frequencies (e.g. once every 10 seconds, once every minute, etc.). The processor(s) 404 may detect, estimate, quantify, identify, or otherwise determine a first duration 508, for modifying the phase of data capture so as to reduce the first duration 508 (as shown in FIG. 5B).

In some embodiments, the processor(s) 404 may determine the first duration 508 by determining a first timestamp associated with the processors(s) 404 adding data to the queue of the memory 406, and determining a second timestamp associated with the communication device 414 waking up and pulling the data from the queue to transmit the data from the queue to the endpoint. For example, when, at step 604, the processor(s) add data to the queue, the processor(s) 404 may incorporate the first timestamp to the queue in association with the data. Additionally, when, at step 606, the device 400 transmits the data, the processor(s) 404 may identify the second timestamp corresponding to the time at which the device transmitted the data to the endpoint. The processor(s) 404 may determine the first duration 508 by calculating the difference between the first timestamp and the second timestamp.

In some embodiments, the processor(s) 404 may determine the first duration 508 using the configuration information of the device 400, the sampling frequency, and/or an average data processing duration. The processor(s) 404 may determine configuration information of the communication device 414 including a wake time for pulling data from the queue and a frequency of the communication device 414. For example, the processor(s) 404 may ping or query the communication device 414 for the configuration information, and can determine the configuration information based on a response from the communication device 414. Also, the processor(s) 404 may determine, from an application executing on the device 400, the sampling frequency at which the sensor(s) 402 capture data. Similar to pinging or querying the communication device 414, the processor(s) 404 may send a query or request to the application or resource executing on the device to determine the sampling frequency. Additionally or alternatively, the processor(s) 404 may send a request or query to the sensor(s) 402 to determine a current sampling frequency of the sensor(s) 402. The processor(s) 404 may determine the average data processing duration based on previous data capture instances. For example, and similar to determining the first duration 508 based on timestamps as described above, the sensor(s) 402 and/or the processor(s) 404 may add or incorporate a timestamp associated with data beginning to be processed and/or data being captured by the sensor(s) 402. Additionally, after the processor(s) 404 process the data, the processor(s) 404 may add the data to the queue for transmission to an endpoint and may add or incorporate a timestamp associated with data being added to the queue. The processor(s) 404 may determine the average data processing duration based on the difference between a set of timestamps associated with data beginning to be processed and/or data being captured by the sensor(s) 402, and a set of timestamps associated with data being added to the queue. The processor(s) 404 may determine average data processing duration by computing an average of the difference between associated timestamps of the respective sets, for data beginning to be processed and/or data being captured by the sensor(s) and data being added to the queue for previous data capture instances.

Once the processor(s) 404 determine the average data processing duration, the processor(s) 404 may determine, quantify, or otherwise estimate when the processor(s) 404 may add data to the queue (e.g., by adding the average data processing duration to the current start time for data capture according to the sampling frequency of the sensor(s) 402).

Additionally, the processor(s) 404 may determine when the communication device 414 pulls data from the queue and its frequency, based on the configuration information of the communication device 414. The processor(s) 404 may thus determine the first duration 508 by calculating the difference between the time when the processor(s) 404 may add data to the queue of the memory 406 and the time when the communication device 414 pulls data from the queue.

At step 610, the processor(s) 404 may modify a phase of data capture via the sensor(s) 402 according to the duration. The processor(s) 404 may modify the phase responsive to computing the duration (e.g., at step 608). The processor(s) 404 may modify the phase by applying a phase shift determined according to the duration, to the phase of data capture via the sensor(s) 404. In some embodiments, the processor(s) 404 may modify the phase after every instance that data is transmitted (e.g., to progressively reduce the duration in which data is in the queue). In some embodiments, the processor(s) 404 may modify the phase when the duration of data in the queue is greater than a threshold value. For example, the threshold value may be an offset value applied to the duration for determining the phase shift to apply to the phase of data capture. For example, when the first duration 508 exceeds the offset value, the processor(s) 404 may modify the phase to reduce the first duration 508 until the first duration 508 equals the offset. Such implementations and embodiments may improve user experience by decreasing latency (e.g., by having the data queued for a shorter duration). In some embodiments, the phase may be modified according to duration reduced by an offset.

As illustrated in FIG. 6, following modifying the phase, the method 600 may loop back to step 602, where the device 400 captures subsequent data via the sensor(s) 402 (e.g., according to the modified phase). In this example, following modifying the phase, the processor(s) 404 may process the captured (e.g., subsequent) data, and add the processed data to the queue for a second duration (as illustrated in FIG. 5B) which is less than the first duration (illustrated in FIG. 5A). As such, by modifying the phase of data capture at step 610, latency may be reduced by limiting the duration in which data is queued for transmission via the communication device to the endpoint.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:

determining, by a device, a duration in which data is in a queue prior to transmission to an endpoint;

modifying, by the device, a phase of data capture via a sensor, according to the duration reduced by a predefined offset, the sensor capturing the data according to the phase and a common sampling frequency;

capturing, by the device via the sensor, subsequent data according to the phase modified according to the duration reduced by the predefined offset and at the common sampling frequency; and transmitting, by the device from the queue, the subsequent data to the endpoint.

2. The method of claim 1, wherein determining the duration comprises:

determining, by the device, a first timestamp associated with the data being added to the queue;

determining, by the device, a second timestamp associated with the data being transmitted from the queue to the endpoint; and determining, by the device, the duration according to a difference between the first timestamp and the second timestamp.

3. The method of claim 1, wherein determining the duration comprises:

determining, by the device, configuration information including a wake time and a frequency of a modem for the device;

determining, by the device, from an application executing on the device, the common sampling frequency; and determining, by the device, the duration according to the configuration information, the sampling frequency, and an average data processing duration.

4. The method of claim 3, further comprising:

determining, by the device, the average data processing duration according to one or more first timestamps for previous data captured via the sensor and one or more second timestamps for the previous data being added to the queue for transmission.

5. The method of claim 1, wherein the data is first data, and wherein the first data and the subsequent data are captured at the common sampling frequency set by an application executing on the device.

6. The method of claim 1, wherein the device transmits the subsequent data from the queue to the endpoint according to a connected mode-discontinuous reception (C-DRX) schedule.

7. The method of claim 1, wherein the sensor comprises at least one of an imager or a microphone.

8. The method of claim 1, wherein the duration is a first duration, the method further comprising:

adding, by the device, the subsequent data to the queue for transmission to the endpoint; and transmitting, by the device, the subsequent data from the queue to the endpoint, after a second duration in which the subsequent data is in the queue, the second duration being less than the first duration.

9. A device, comprising:

at least one processor configured to:

determine a duration in which data is in a queue prior to transmission to an endpoint;

modify a phase of data capture via a sensor, according to the duration reduced by a predefined offset, the sensor capturing the data according to the phase and a common sampling frequency;

capture, via the sensor, subsequent data according to the phase modified according to the duration reduced by a predefined offset and at the common sampling frequency; and transmit the subsequent data from the queue to the endpoint.

10. The device of claim 9, wherein to determine the duration, the one or more processors are configured to:

determine a first timestamp associated with the data being added to the queue;

determine a second timestamp associated with the data being transmitted from the queue to the endpoint; and determine the duration based on a difference between the first timestamp and the second timestamp.

11. The device of claim 9, wherein to determine the duration, the one or more processors are configured to:

determine configuration information including a wake time and a frequency of a modem for the device;

determine, from an application executing on the device, the common sampling frequency; and determine the duration according to the configuration information, the common sampling frequency, and an average data processing duration.

12. The device of claim 11, wherein the one or more processors are configured to:

determine the average data processing duration according to one or more first timestamps for previous data captured via the sensor and one or more second timestamps for the previous data being added to the queue for transmission.

13. The device of claim 9, wherein the data is first data, and wherein the first data and the subsequent data are captured at the common sampling frequency set by an application executing on the device.

14. The device of claim 9, wherein to transmit the subsequent data, the one or more processors are configured to transmit the subsequent data from the queue to the endpoint according to a connected mode-discontinuous reception (C-DRX) schedule.

15. The device of claim 9, wherein the sensor comprises at least one of an imager or a microphone.

16. The device of claim 9, wherein the duration is a first duration, wherein the one or more processors are configured to:

add the subsequent data to the queue for transmission to the endpoint; and transmit the subsequent data from the queue to the endpoint, after a second duration in which the subsequent data is in the queue, the second duration being less than the first duration.

17. A non-transitory computer readable medium storing instructions that, when executed by one or more processors, cause the one or more processors to:

determine a duration in which data is in a queue prior to transmission to an endpoint;

modify a phase of data capture via a sensor, according to the duration reduced by a predefined offset, the sensor capturing the data according to the phase and a common sampling frequency;

capture, via the sensor, subsequent data according to the phase modified according to the duration reduced by a predefined offset and at the common sampling frequency; and transmit the subsequent data from the queue to the endpoint.

18. The non-transitory computer readable medium of claim 17, wherein the duration is a first duration, wherein the instructions cause the one or more processors to:

add the subsequent data to the queue for transmission to the endpoint; and transmit the subsequent data from the queue to the endpoint, after a second duration in which the subsequent data is in the queue, the second duration being less than the first duration.

* * * * *